(No Model.)
B. F. APPLEGATE & B. F. LAGEL.
BAND CUTTER AND DISTRIBUTER FOR THRASHING MACHINES.
No. 340,273.  Patented Apr. 20, 1886.
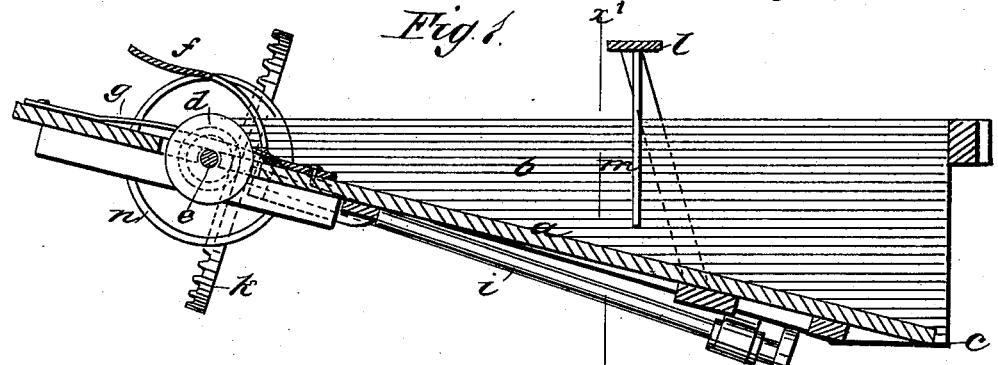
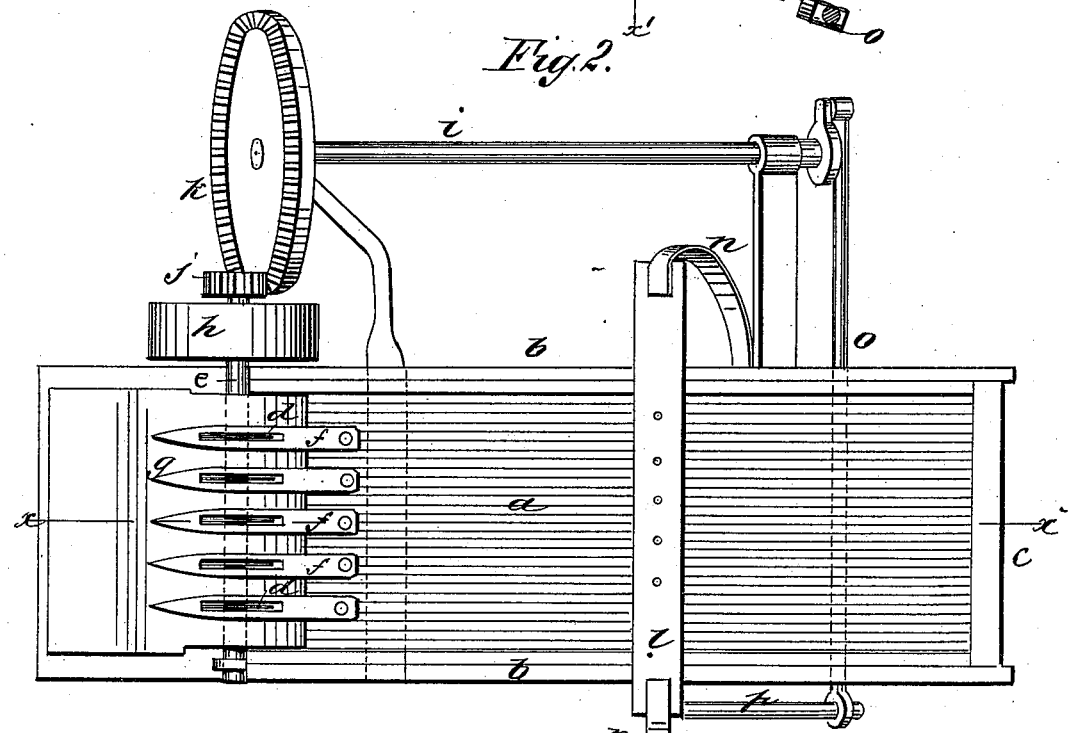
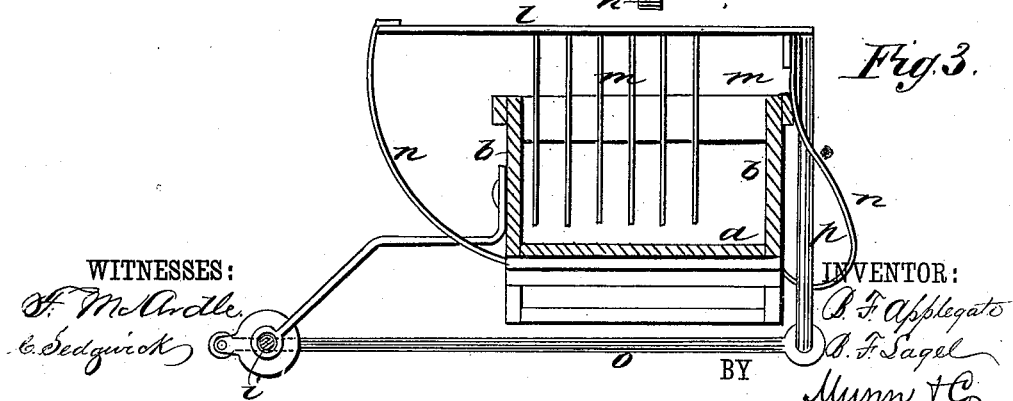
WITNESSES:
INVENTOR:
B. F. Applegate
B. F. Lagel
BY Munn & Co.
ATTORNEYS.
N. PETERS, Photo-Lithographer, Washington, D. C.

UNITED STATES PATENT OFFICE.

BENJAMIN FRANKLIN APPLEGATE AND BENJAMIN FRANKLIN LAGEL, OF NEW ALBANY, INDIANA.

BAND-CUTTER AND DISTRIBUTER FOR THRASHING-MACHINES.

SPECIFICATION forming part of Letters Patent No. 340,273, dated April 20, 1886.

Application filed July 17, 1885. Serial No. 171,916. (No model.)

*To all whom it may concern:*

Be it known that we, BENJAMIN FRANKLIN APPLEGATE and BENJAMIN FRANKLIN LAGEL, of New Albany, in the county of Floyd and State of Indiana, have invented a new and Improved Band-Cutter and Distributer for Thrashing-Machines, of which the following is a full, clear, and exact description.

Our invention consists in the construction and arrangement of parts, as will be hereinafter fully described and claimed.

Reference is to be had to the accompanying drawings, forming part of this specification, in which similar letters of reference indicate corresponding parts in all the figures.

Figure 1 is a longitudinal sectional elevation of our improved feeder, taken on the line $x\ x$ of Fig. 2. Fig. 2 is a plan view. Fig. 3 is a transverse section taken on the line $x'\ x'$ of Fig. 1.

We make a feeding-chute consisting of the sloping bottom $a$ and sides $b$, which is to be attached at the end $c$ to the feed-board of the thrashing-machine, and near the other end we arrange a series of rotary band-cutters, $d$, on a shaft, $e$, extending across the chute from side to side, and over each band-cutter we arrange a slotted spring-guard, $f$, for the protection of the attendant, who places the bundles upon said guard, so that the bands will be cut by them, and at the same time pushes the bundles along the chute to the thrashing cylinder. The shaft $e$ of the band-cutters is arranged about in the level of the bottom $a$, which has an opening cut through it for the shaft and the cutters, and a slotted plate, $g$, of thin metal is placed over said opening, to guard the grain from being forced down through the opening by the cutters, the slots of said plate being sufficiently close-fitting to hold the grain back. The cutters may have hook-shaped teeth, such as represented in Fig. 4, or they may be in the form of saw-teeth or other approved form. The shaft $e$ has a pulley, $h$, applied to it at one end, for driving it by a belt from any suitable part of the machine, and said shaft also gears with a crank-shaft, $i$, by a pinion, $j$, and wheel $k$, for working the distributer or spreader, which we employ for effecting uniform delivery of the grain to the thrashing-cylinder throughout its whole length, and which consists of the rake-head $l$, located over the feed-chute, and teeth $m$, connected thereto and hanging down into the feed-chute. The bar $l$ is mounted on spring-supports $n$, allowing it to vibrate transversely to the chute, so as to spread apart the bundles while being shoved along past the teeth, to distribute them evenly over the whole breadth of the chute, and said springs also allow the teeth to rise a little in case bundles are unusually large and compact. The crankshaft $i$ is connected to the rake by the connecting-rod $o$ and the rigid arm $p$ thereof.

Having thus described our invention, we claim as new and desire to secure by Letters Patent—

1. The combination of the slotted spring-guards, the feed-chute, a plate, $g$, secured to the bottom thereof and formed with slots, and the rotary circular knives $d$, projecting through the slots, the slots in the plate $g$ being sufficiently close-fitting to prevent the passage of grain, substantially as set forth.

2. The combination, with the feed-chute $a\ b$ and the rotary band-cutters $d$ in the bottom thereof, of the slotted spring-guards $f$ over the cutters, substantially as set forth.

BENJAMIN FRANKLIN APPLEGATE.
BENJAMIN FRANKLIN LAGEL.

Witnesses:
JOHN H. STOTSENBURG,
MARTIN L. UNDERHILL.